(12) United States Patent
Ohr et al.

(10) Patent No.: US 9,334,907 B2
(45) Date of Patent: May 10, 2016

(54) CLUTCH ASSEMBLY

(71) Applicant: Schaeffler Technologies GmbH & Co. KG, Herzogenaurach (DE)

(72) Inventors: Carsten Ohr, Charlotte, NC (US); Brian Lee, York, SC (US); Guihui Zhong, Charlotte, NC (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/339,950

(22) Filed: Jul. 24, 2014

(65) Prior Publication Data

US 2015/0060223 A1    Mar. 5, 2015

Related U.S. Application Data

(60) Provisional application No. 61/871,035, filed on Aug. 28, 2013.

(51) Int. Cl.
*F16D 41/08* (2006.01)
*F16D 13/14* (2006.01)
*F16D 15/00* (2006.01)

(52) U.S. Cl.
CPC .............. *F16D 41/082* (2013.01); *F16D 13/14* (2013.01); *F16D 15/00* (2013.01)

(58) Field of Classification Search
None
See application file for complete search history.

(56) References Cited

U.S. PATENT DOCUMENTS

| 658,520 | A | * | 9/1900 | Abel | ................. F16D 13/18 192/107 T |
| 1,014,865 | A | * | 1/1912 | Cook | ................. F16D 13/12 192/78 |

OTHER PUBLICATIONS

Utility U.S. Appl. No. 14/263,219, filed Apr. 28, 2014, entitled Wedge Clutch With a Split Hub, Strong.

* cited by examiner

*Primary Examiner* — Jacob S Scott
(74) *Attorney, Agent, or Firm* — Simpson & Simpson, PLLC

(57) ABSTRACT

A clutch, having an outer race, an inner race, a wedge plate radially arranged between the outer race and the inner race and including an outer circumferential surface, an inner circumferential surface, and a radially continuous space connecting the outer circumferential surface and the inner circumferential surface, and a locking assembly including a displaceable locking component. For a free-wheel mode, the inner and outer races are rotatable with respect to each other. For a locking mode, the locking component is displaceable within the radially disposed space of the wedge plate to engage the wedge plate to radially expand the wedge plate and non-rotatably connect the inner race, the wedge plate, and the outer race.

17 Claims, 11 Drawing Sheets

CLUTCH ASSEMBLY

CROSS-REFERENCE TO RELATED APPLICATIONS

This application claims the benefit of U.S. Provisional Patent application Ser. No. 61/871,035, filed Aug. 28, 2013, which application is hereby incorporated by reference in its entirety.

TECHNICAL FIELD

The present disclosure relates generally to a bi-directional or one-way wedge clutch. More particularly, the present disclosure relates to a wedge clutch including an expandable split wedge plate and a locking assembly having a displaceable locking component to radially expand the wedge plate.

BACKGROUND

Bi-directional clutches enable switching between locking and free-wheel modes. In order to ensure that the bi-directional clutch locks reliably, it is known to design the wedge plate as a spring to ensure some pressure at the wedge plate outside diameter (OD) at all times. This frictional contact results in constant torque drag between the inner and outer races. The constant drag causes energy dissipation and decreases efficiency during operation in free-wheel mode.

SUMMARY

According to aspects illustrated herein, there is provided a clutch, having: an outer race; an inner race; a wedge plate radially arranged between the outer race and the inner race and including: an outer circumferential surface; an inner circumferential surface; and, a radially continuous space connecting the outer circumferential surface and the inner circumferential surface; and, a locking assembly including a displaceable locking component. For a free-wheel mode, the inner and outer races are rotatable with respect to each other. For a locking mode, the locking component is displaceable within the radially continuous space of the wedge plate to engage the wedge plate to: radially expand the wedge plate; and, non-rotatably connect the inner race, the wedge plate, and the outer race.

According to aspects illustrated herein, there is provided a clutch, having: an inner race including a channel; an outer race; a locking assembly including a locking component at least partially disposed in the channel; a wedge plate radially arranged between the inner and outer races and including: an outer circumferential surface; an inner circumferential surface; and, a radially disposed space connecting the inner and outer circumferential surfaces. For a free-wheel mode, the inner and outer races are independently rotatable. For a locking mode: the locking component is radially displaceable through the channel and the radially disposed space and the locking component is arranged to engage the wedge plate radially expand the wedge plate and to non-rotatably connect the inner race, the wedge plate, and the outer race.

According to aspects illustrated herein, there is provided a clutch, having: an inner race; an outer race; a locking assembly secured to the inner race and including a locking ring and a locking component; and, a wedge plate radially arranged between the inner and outer races and including: an outer circumferential surface; an inner circumferential surface; and, a radially disposed space connecting the inner and outer circumferential surfaces. The radially disposed space includes a first end surface and a second end surface that are parallel and bordering the radially disposed space in a circumferential direction. For a free-wheel mode, the inner and outer races are independently rotatable. For a locking mode: the locking component is axially displaceable through the radially disposed space; and, the locking component is arranged to engage the wedge plate to circumferentially and radially expand the wedge plate and to non-rotatably connect the inner race, the wedge plate, and the outer race.

BRIEF DESCRIPTION OF THE DRAWINGS

The nature and mode of operation of the present disclosure will now be more fully described in the following detailed description of the disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure. The assembly of the present disclosure could be driven by hydraulics, electronics, and/or pneumatics.

Figure 1A:
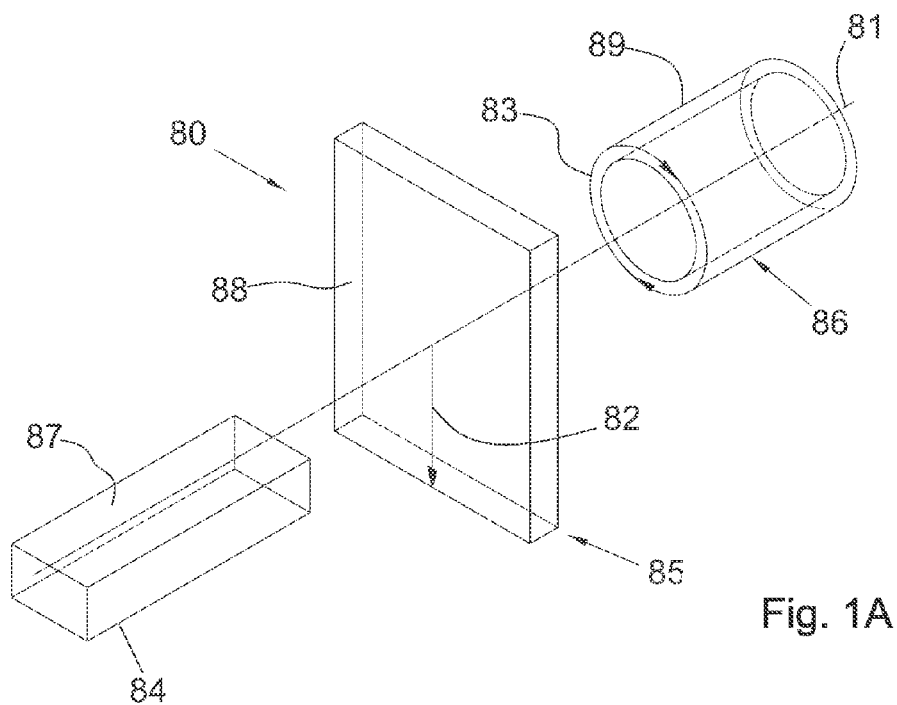
FIG. 1A is a perspective view of a cylindrical coordinate system demonstrating spatial terminology used in the present application.

FIG. 1A is a perspective view of cylindrical coordinate system 80 demonstrating spatial terminology used in the present disclosure. This disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" refer to the orientation parallel to their respective planes. To clarify the disposition of the various planes, objects 84, 85, and 86 are used. Surface 87 of object 84 forms an axial plane. That is, axis 81 forms a line along surface 87. Surface 88 of object 85 forms a radial plane. That is, radius 82 forms a line along surface 88. Surface 89 of object 86 forms a circumferential plane. That is, circumference 83 forms a line along surface 89. As a further example, axial movement or disposition is parallel to axis 81, radial movement or disposition is parallel to radius 82, and circumferential movement or disposition is parallel to circumference 83. Rotation is with respect to axis 81. The adverbs "axially," "radially," and "circumferentially" are with respect to an orientation parallel to axis 81, radius 82, or circumference 83, respectively. The adverbs "axially," "radially," and "circumferentially" refer to an orientation parallel to their respective planes.

Figure 1B:
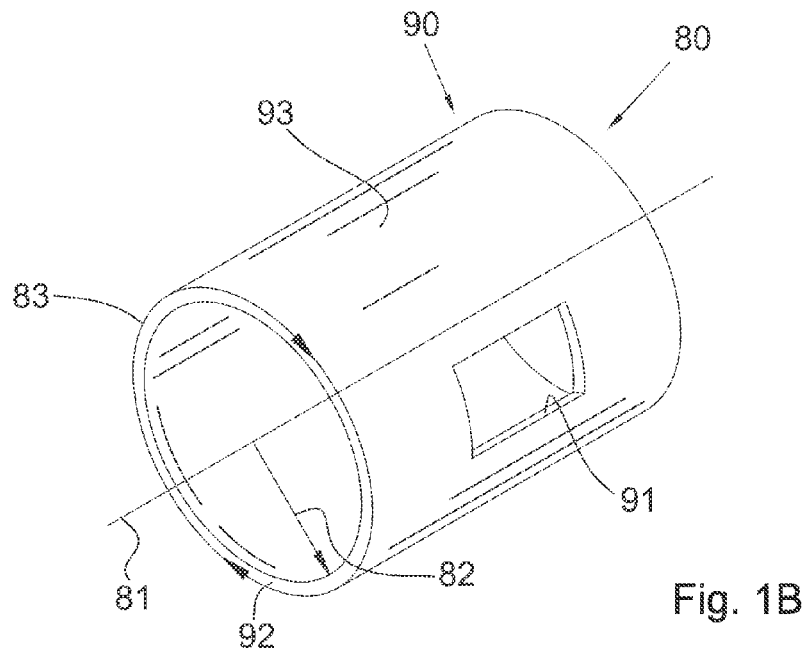
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit this disclosure in any manner. Object 90 includes axial surface 91, radial surface 92, and circumferential surface 93. Surface 91 is part of an axial plane, surface 92 is part of a radial plane, and surface 93 is a circumferential surface.

Figure 2A:
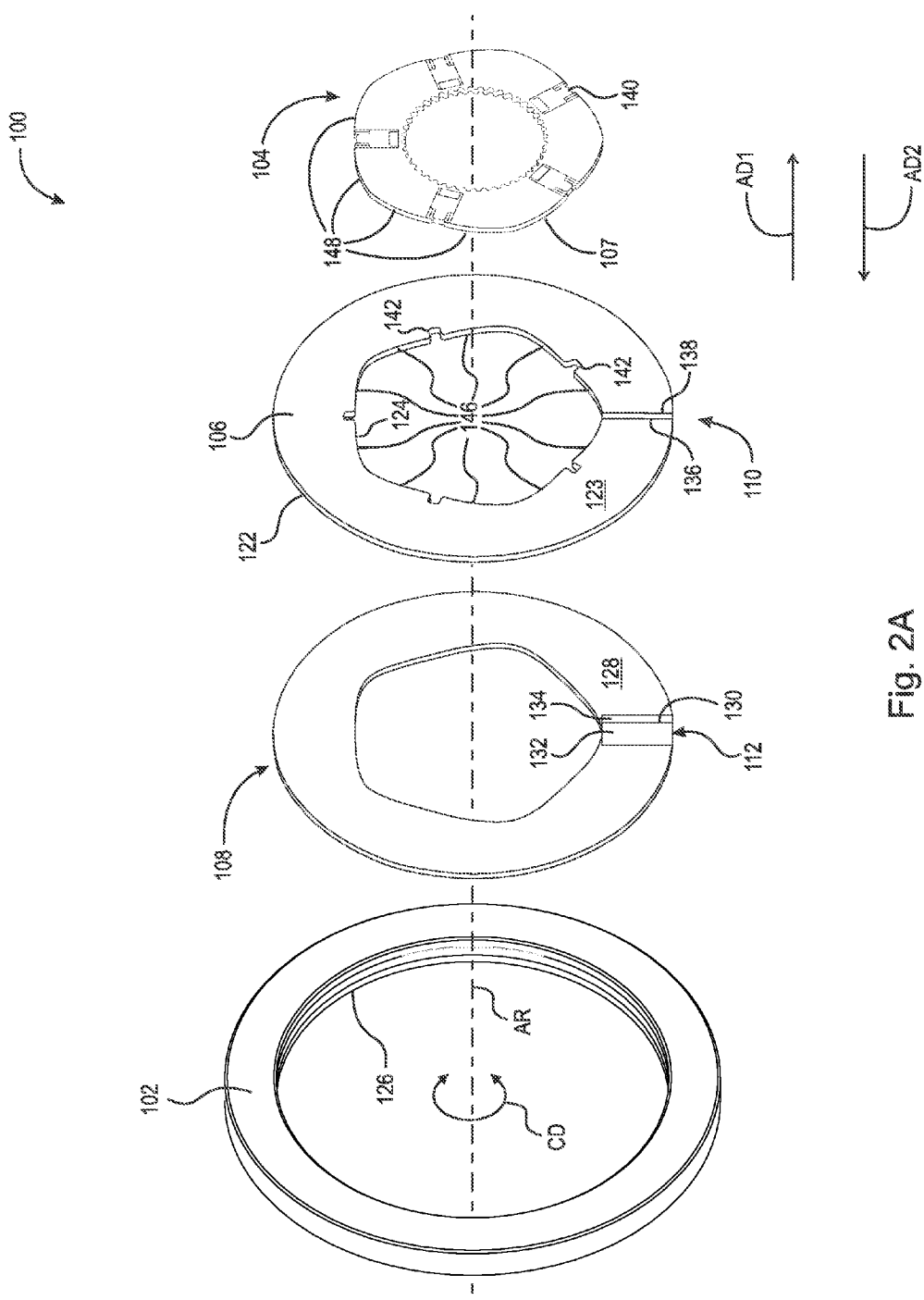
FIG. 2A is an exploded perspective view of a clutch having a split wedge plate.

FIG. 2A is an exploded perspective view of clutch 100 having a split wedge plate.

Figure 2B:
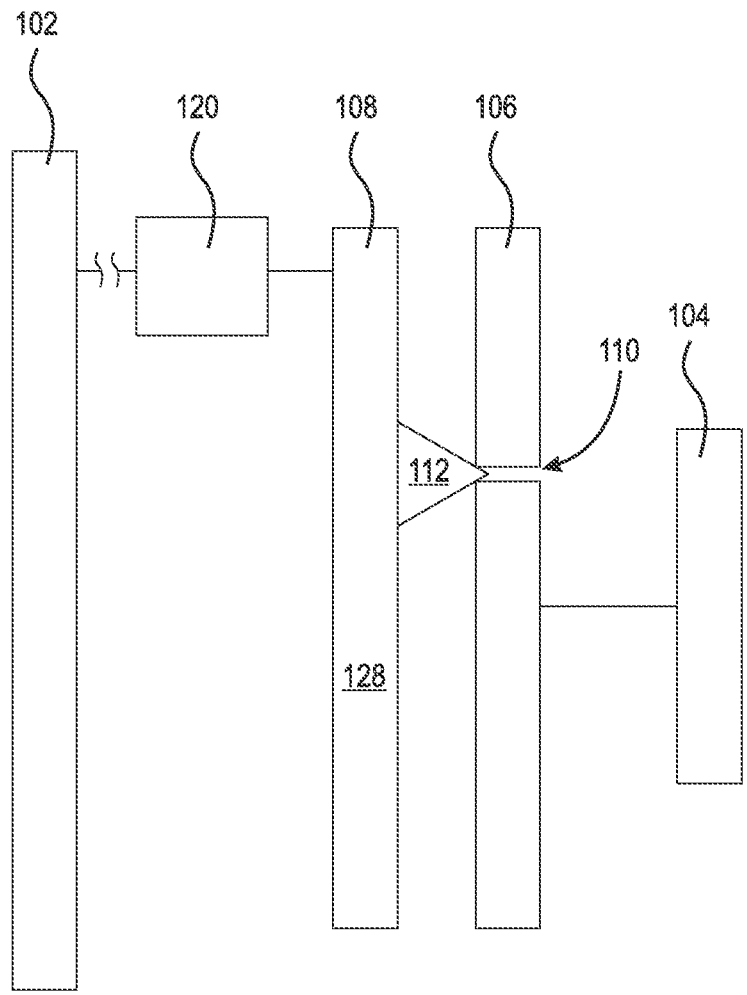
FIG. 2B is a schematic block diagram of a clutch having a split wedge plate.

FIG. 2B is a schematic block diagram of clutch 100 having a split wedge plate.

Figure 3A:
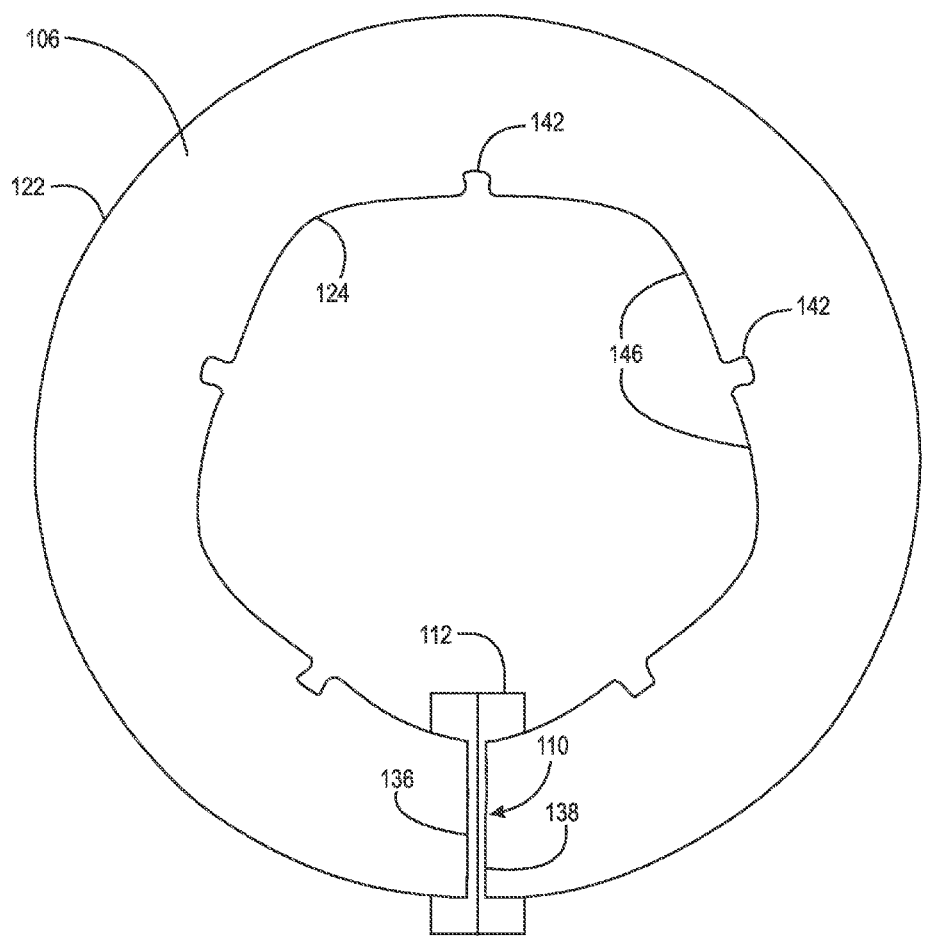
FIG. 3A is a front elevational view of a split wedge plate and locking assembly locking component for a clutch in free-wheel mode.

FIG. 3A is a front elevational view of the split wedge plate of clutch 100 shown in FIG. 2A in free-wheel mode.

Figure 3B:
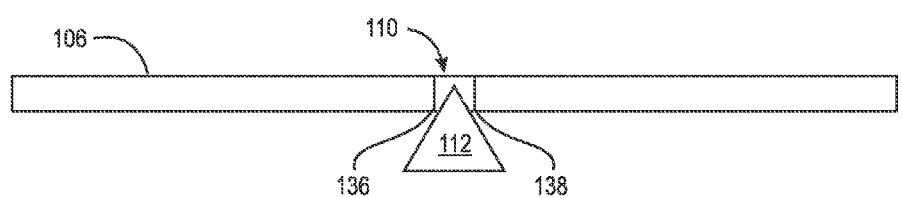
FIG. 3B is a bottom view of the split wedge plate and locking assembly locking component shown in FIG. 3A.

FIG. 3B is a side view of the split wedge plate and part of the locking assembly of clutch 100 shown in FIG. 2A in free-wheel mode.

Figure 4A:
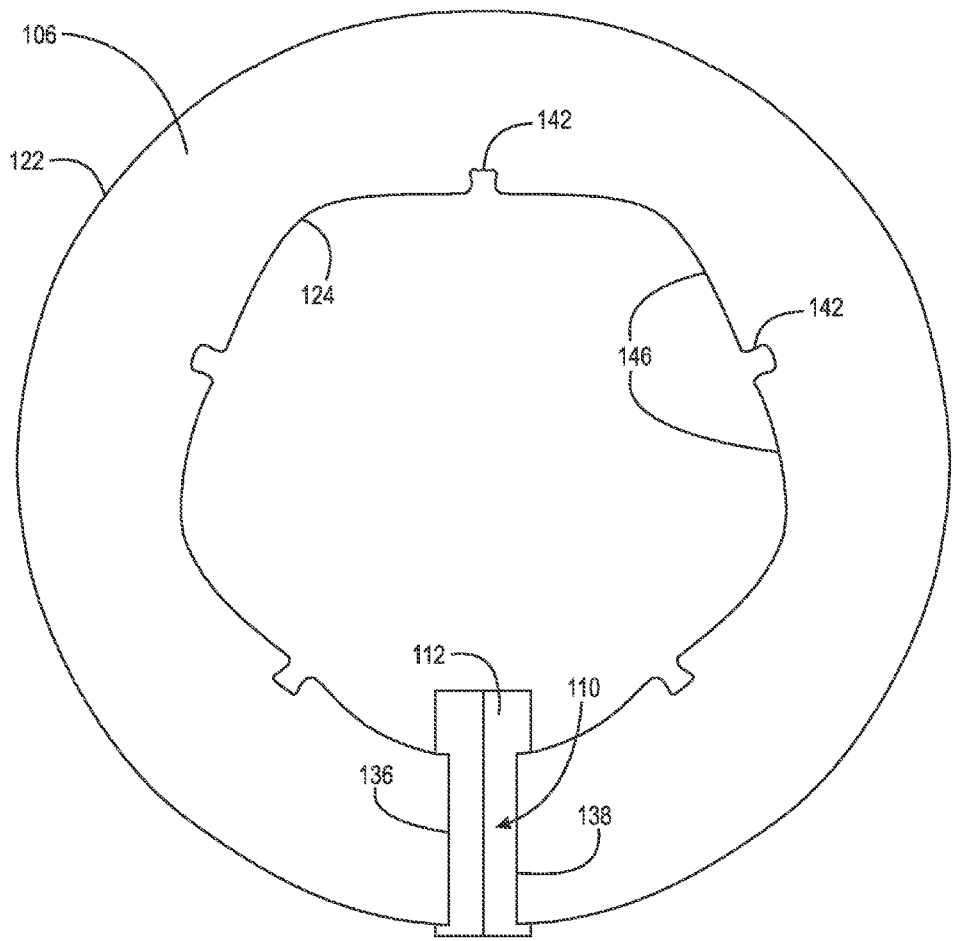
FIG. 4A is a front elevational view of a split wedge plate and locking assembly locking component for a clutch in locking mode.

FIG. 4A is a front elevational view of the split wedge plate of clutch 100 shown in FIG. 2A in locking mode.

Figure 4B:
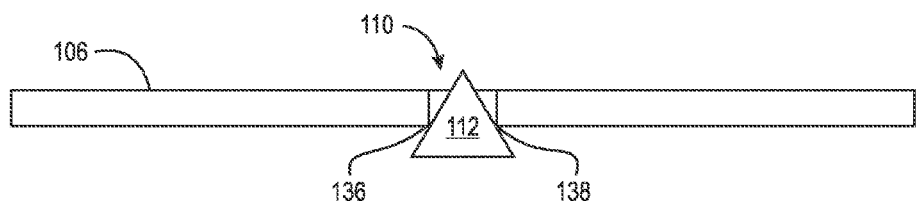
FIG. 4B is a bottom view of the split wedge plate and locking assembly locking component shown in FIG. 4A.

FIG. 4B is a side view of the split wedge plate and part of the locking assembly of clutch 100 shown in FIG. 2A in locking mode.

Figure 5:
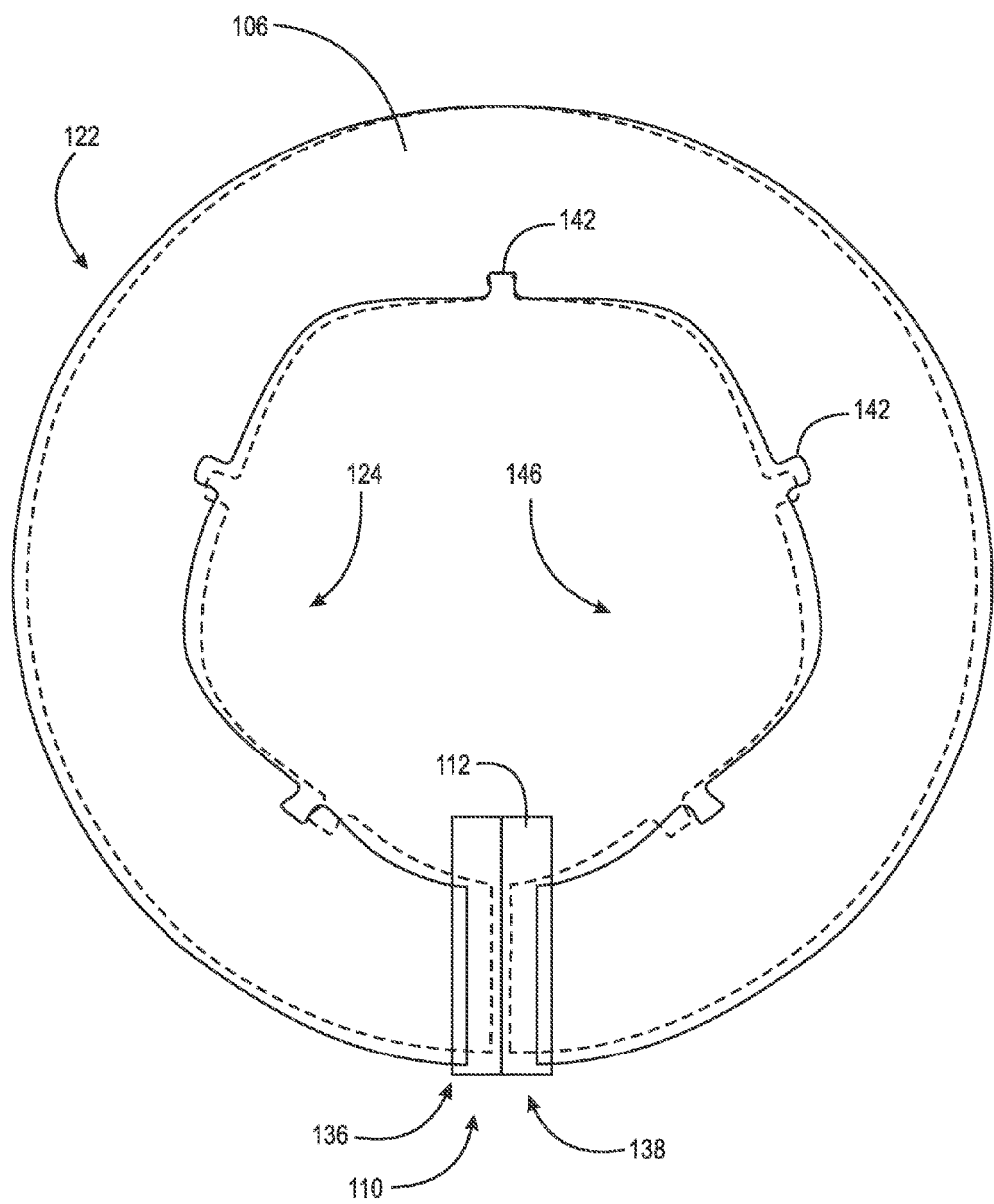
FIG. 5 is a front elevational view of the split wedge plate shown in FIGS. 2A and 3A in free-wheel and locking modes, in dashed lines and solid lines, respectively.

FIG. 5 is a front elevational view of the split wedge plate of clutch 100 shown in FIG. 2A in free-wheel and locking modes, in dashed lines and solid lines, respectively.

Figure 6:
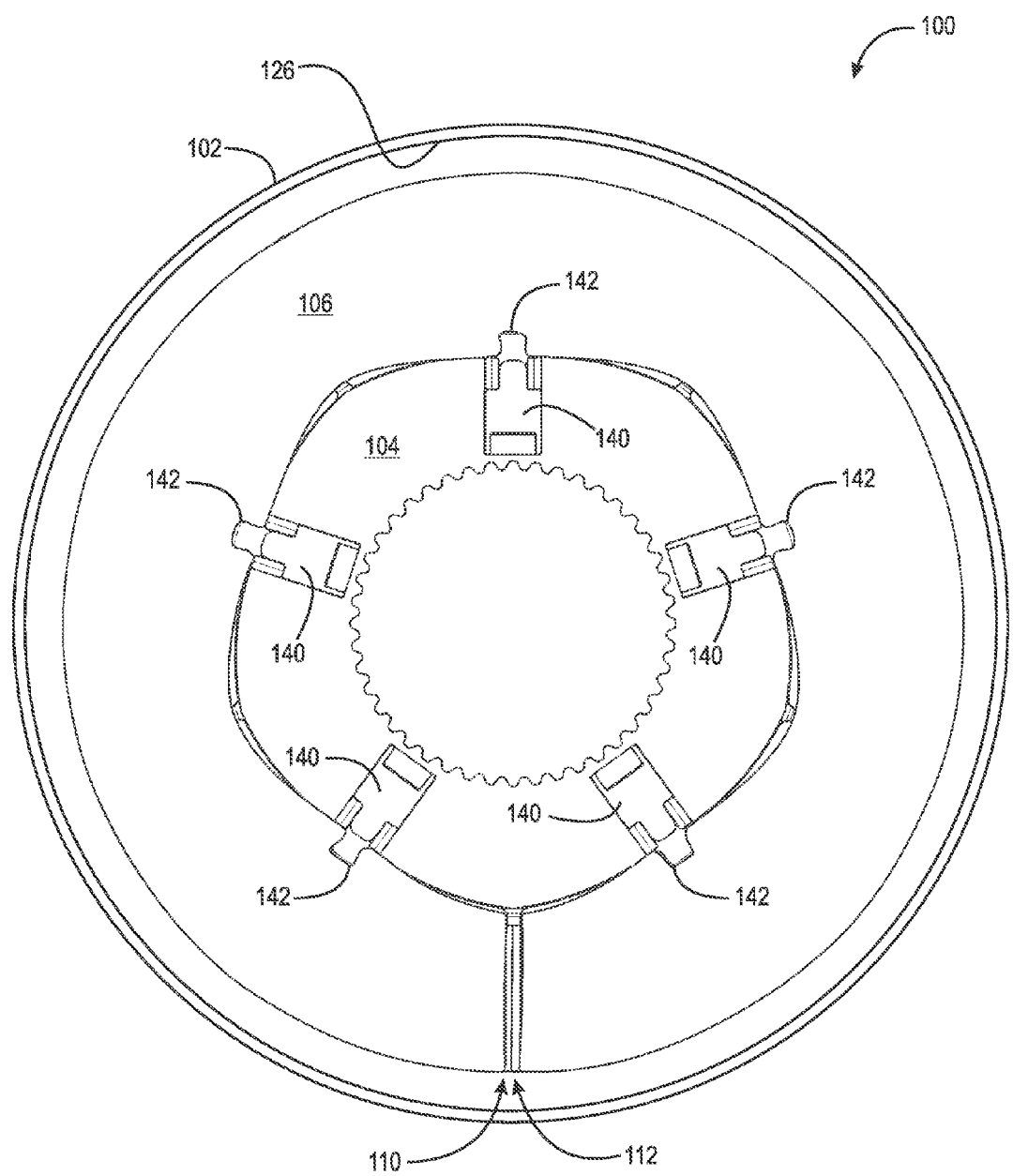
FIG. 6 is an assembled clutch including a split wedge plate in free-wheel mode.

FIG. 6 is a front elevational view of assembled clutch 100 in free-wheel mode. The following should be viewed in light of FIGS. 2A through 6. Clutch 100 includes outer race 102, inner race 104, wedge plate 106, and locking assembly 108. Wedge plate 106 is radially arranged between inner and outer races, 104 and 102, respectively, and includes outer circumferential surface 122, inner circumferential surface 124, and radially continuous, or radially disposed, space 110 connecting circumferential surfaces 122 and 124. Locking assembly 108 includes displaceable locking component 112. For a free-wheel mode, outer race 102 and inner race 104 are rotatable with respect to each other. For a locking mode, locking component 112 is displaceable within space 110 to engage the wedge plate to radially expand the wedge plate and non-rotatably connect outer race 102, inner race 104, and wedge plate 106. In an example embodiment, locking component 112 is displaceable within space 110 to engage the wedge plate to circumferentially expand the wedge plate. In an example embodiment, wedge plate 106 includes only a single radially disposed space 110 and locking assembly 108 includes only a single locking component 112.

In an example embodiment, wedge plate 106 is pre-tensioned radially inward to resist radial outward displacement and to facilitate engagement with the inner race. In an example embodiment, outer race 102, inner race 104, wedge plate 106 and locking assembly 108 are co-axial with axis of rotation AR meaning outer race 102, inner race 104, wedge plate 106 and locking assembly 108 are rotatable with axis AR.

In an example embodiment, assembly 108 includes axially displaceable locking ring 128 and locking component 112 extends from the locking ring in axial direction AD1. In an example embodiment, the locking component is a triangular prism including radially disposed leading edge 130 and oppositely arranged axially tapering sides 132 and 134 connected to edge and the locking ring 130. In an example embodiment, edge 130 is parallel to surface 123 of the wedge plate.

In an example embodiment, the wedge plate includes surfaces 136 and 138 bordering space 110 in circumferential direction CD and surfaces 132 and 134 are arranged to engage surface 136 and 138, respectively, to radially expand the wedge plate. In an example embodiment, surfaces 136 and 138 are parallel to each other.

In an example embodiment, locking assembly 128 includes actuator 120 arranged to displace locking component 112. For example, actuator 120 is arranged to axially displace ring 128 and locking component 112. Any actuator known in the art can be used for actuator 120, including, but not limited to, a screw, electric actuator, pneumatic actuator, or hydraulic actuator.

In free-wheel mode, inner circumferential surface 126 of outer race 102 is free of contact with outer circumferential surface 122 of wedge plate 106, or has nominal contact with surface 122, enabling clutch 100 to operate with little or no frictional drag between the outer race and the wedge plate. In locked mode, inner circumferential surface 126 of outer race 102 is in contact with outer circumferential surface 122 of wedge plate 106 enabling clutch 100 to operate with zero lash.

In an example embodiment, wedge plate 106 includes radially inwardly extending ramps 146 and inner race 104 includes radially outwardly extending ramps 148. The radially inwardly and outwardly extending ramps are operatively arranged to engage. Due to the arrangement of ramps 146 and 148, either wedge plate 106 or inner race 104 can rotate in either rotational direction to engage the other. For example, relative rotation of the wedge plate with respect to the inner race causes ramps 146 to ride up, or slide along, ramps 148, pushing wedge plate 106 radially outward.

Figure 7A:
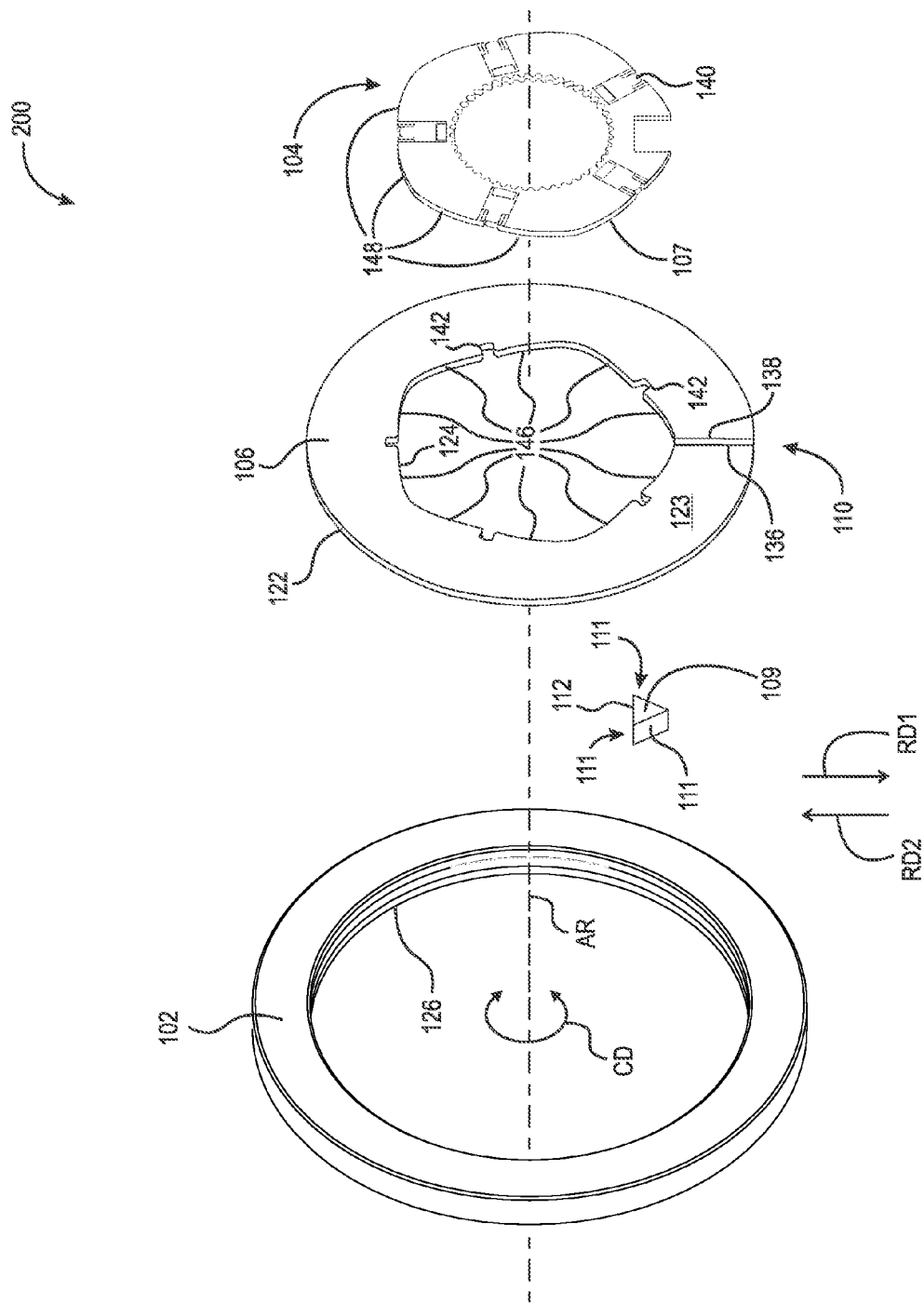
FIG. 7A is an exploded perspective view of a clutch including a split wedge plate.

FIG. 7A is an exploded perspective view of clutch 200.

Figure 7B:
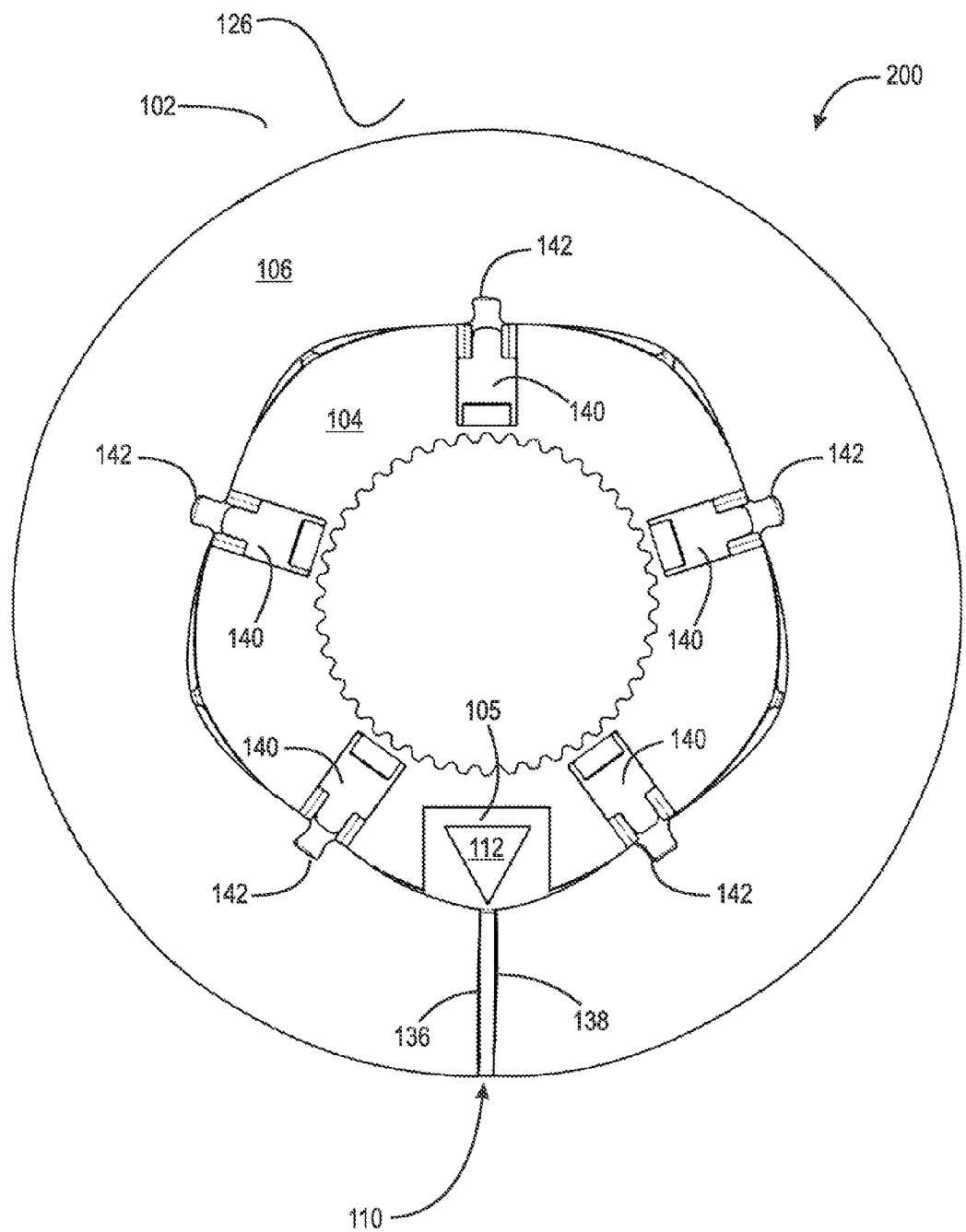
FIG. 7B is an assembled clutch including a split wedge plate in free-wheel mode.

FIG. 7B is a front elevational view of assembled clutch 200 in free-wheel mode. The following should be viewed in light of FIGS. 2A through 7B. The description of clutch 100 is applicable to clutch 200 except as noted below. Inner race 104 includes channel 105. Locking assembly 108 includes locking component 112 at least partially disposed in channel 105. For a locking mode, locking component 112 is displaceable in radial direction RD1 through channel 105 and radially disposed space 110 to engage wedge plate 106 to radially expand wedge plate 106 and to non-rotatably connect inner race 104, wedge plate 106, and outer race 102. In an example embodiment, locking component 112 is displaceable in radial direction RD1 within space 110 to engage wedge plate 106 to circumferentially expand wedge plate 106. In an example embodiment, wedge plate 106 includes only a single radially disposed space 110 and locking assembly 108 includes only a single locking component 112.

In an example embodiment, locking component 112 is a triangular prism including radially disposed face 109 and at least two oppositely arranged circumferentially disposed tapering sides 111 connected to radially disposed face 109. In an example embodiment, radially disposed face 109 is orthogonal to axis of rotation AR for clutch 200. In an example embodiment, the at least two oppositely arranged circumferentially disposed tapering sides 111 are arranged to engage surfaces 136 and 138, respectively, to radially and circumferentially expand the wedge plate.

In an example embodiment, locking assembly 108 includes actuator 120 arranged to displace locking component 112. For example, actuator 120 is arranged to radially displace locking component 112 in direction RD1. Any actuator known in the art can be used for actuator 120, including, but not limited to, a screw, electric actuator, pneumatic actuator, or hydraulic actuator.

Figure 8A:
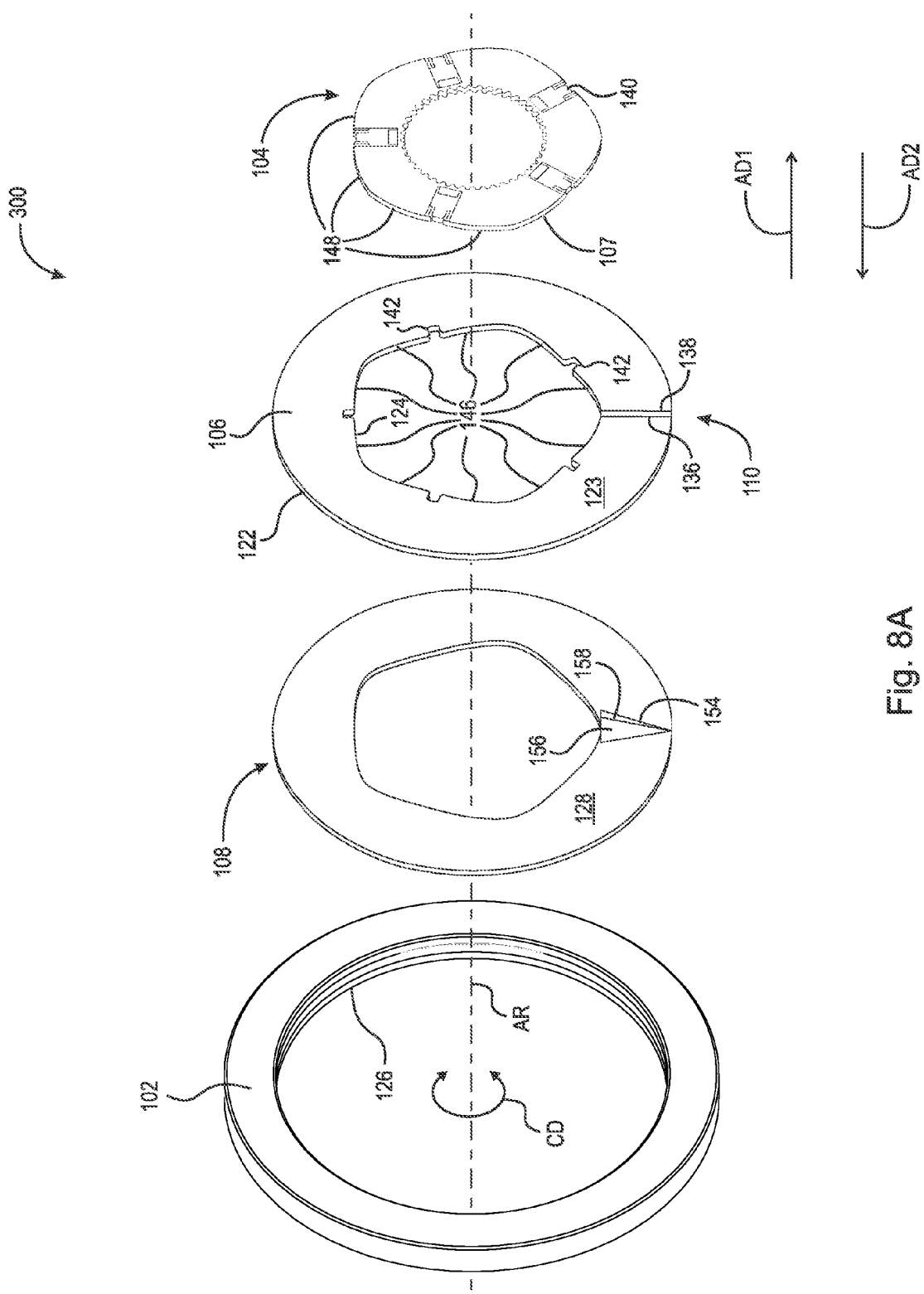
FIG. 8A is an exploded perspective view of a clutch including a split wedge plate; and, FIG. 8B is an assembled clutch including a split wedge in free-wheel mode.

FIG. 8A is an exploded perspective view of clutch 300.

Figure 8B:
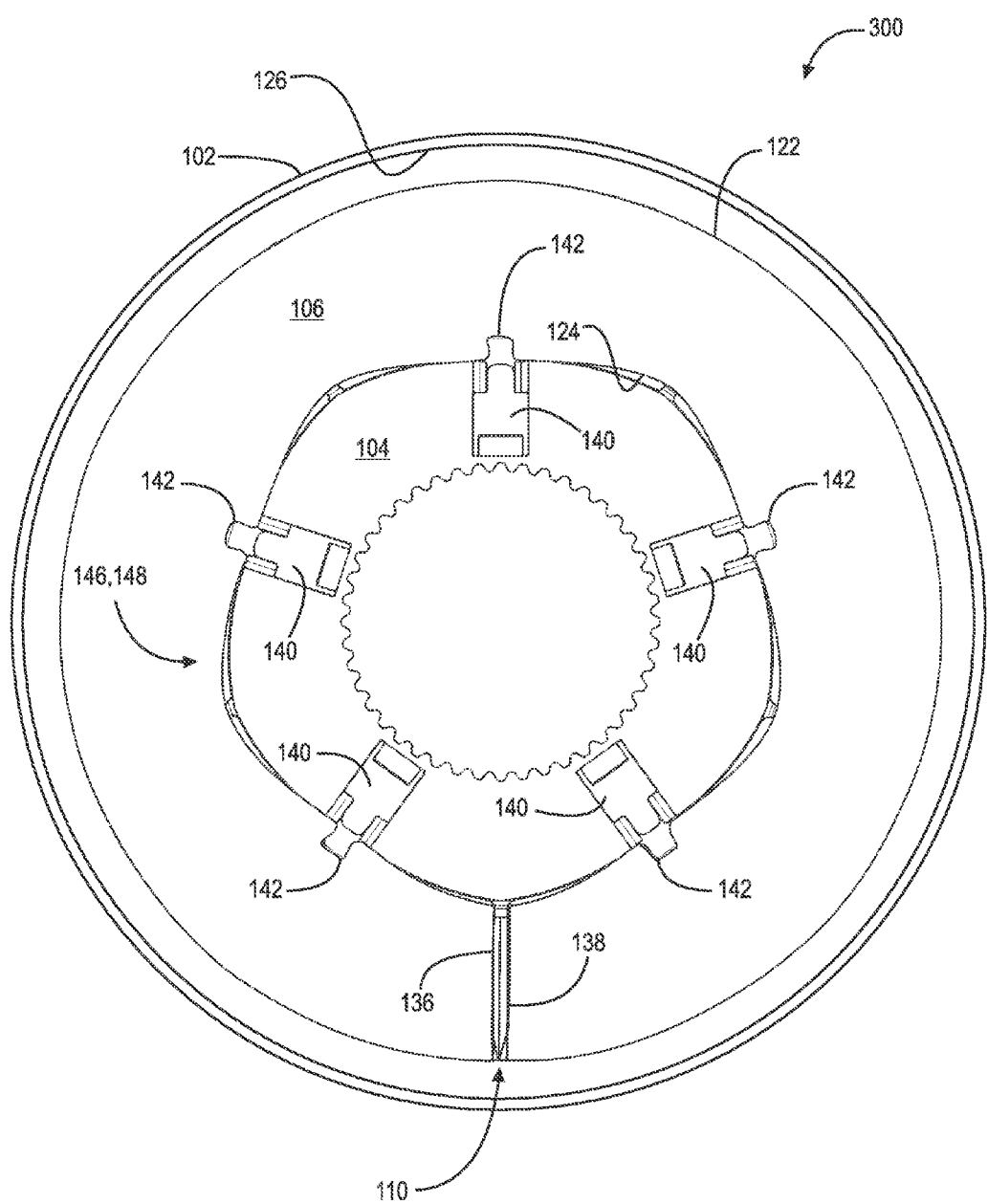

FIG. 8B is a front elevational view of assembled clutch 300 in free-wheel mode. The following should be viewed in light of FIGS. 2A through 8B. The description of clutch 100 is applicable to clutch 300 except as noted below.

As shown in FIGS. 8A and 8B, in an example embodiment, locking component 112 is a triangular pyramid including radially disposed leading edge 154 and two oppositely arranged axially tapering sides 156 and 158 connected to radially disposed leading edge 154 and locking ring 128. Radially disposed leading edge 154 is angled toward locking ring 128, for example, is sloped with respect to surface 123 of the wedge plate. It should be appreciated that locking component 112 shown in FIGS. 8A and 8B could be incorporated in any embodiment described herein.

Advantageously, in free-wheel mode, there is little or no drag between wedge plate 106 and outer race 102. In locking mode, outer and inner races 102 and 104 are non-rotatably connected for relative rotation between outer race 102 and inner race 104.

In an example embodiment, clutch 100 is used to provide torque to an accessory drive system. For instance, in locking mode, clutch 100 transfers torque to a planetary gear that helps start an engine. If clutch 100 is disengaged, in free-wheel mode, the planetary gear is not in use.

For clutches 100, 200, and 300, outer race 102 can be connected to an input source while inner race 104 is an output, or outer race 102 can be an output when inner race 104 is connected to an input source. The preceding configurations enable torque transmission in the locking mode.

It should be appreciated that, for clutches 100, 200, and 300, wedge plate 106 could include more than one radially disposed space 110 and locking assembly 108 could include more than one displaceable locking component 112 or locking component 112. In an embodiment including more than only one single radially disposed space 110 and displaceable locking component or locking component 112, the radially disposed spaces 110 and displaceable locking components 112 can be arranged in any suitable pattern. For example, evenly distributed circumferentially.

In the locking mode of FIGS. 4A and 4B, as compared with the free-wheel mode of FIGS. 3A and 3B, radially disposed space 110 is expanded circumferentially. As shown in FIG. 5, outer circumferential surface 122, in the locked mode, has a greater diameter than outer circumferential surface 122, in the free-wheel mode. When displaceable locking component 112 is fully engaged, clutch 100 is locked and clutch 100 operates with zero lash.

To transition from the locked mode to the free-wheel mode, for clutches 100 and 300 or 200, actuator 120 displaces displaceable locking component 112 or locking component 112 in direction AD2 or RD2, respectively. During displacement of the locking component, radially disposed space 110 contracts circumferentially and outer circumferential surface 122 retracts radially inwardly, thereby removing or reducing contact between wedge plate 106 and outer race 102. Once wedge plate 106 breaks or reduces contact with outer race 102, clutches 100, 200, and 300 are in free-wheel mode.

In respective example embodiments, for clutches 100, 200, and 300, inner race 104 includes pins 140 and wedge plate 106 includes indents 142. Each pin 140 is embedded within and circumferentially disposed along outer circumferential surface 107. Pins 140 are displaceable radially. Each indent 142 is embedded within and circumferentially disposed along inner circumferential surface 124. Pins 140 are displaceable radially outward from inner race 104 into respective indents 142 to prevent rotation of wedge plate 106 relative to inner race 104. To initiate locking mode, pins 140 are radially inwardly displaced to withdraw from indents 142 to enable relative rotation of inner race 104 and the wedge plate as described above.

It should be appreciated that radially disposed space 110 can be defined by angled surfaces or non-parallel surfaces.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A clutch, comprising:
an outer race;
an inner race; including a plurality of radially outwardly extending ramps;
a wedge plate radially arranged between the outer race and the inner race and including:
a plurality of radially inwardly extending ramps operatively arranged to engage the plurality of radially outwardly extending ramps;
an outer circumferential surface;
an inner circumferential surface; and,
a radially continuous space connecting the outer circumferential surface and the inner circumferential surface; and,
a locking assembly including a displaceable locking component, wherein:
for a free-wheel mode, the inner and outer races are rotatable with respect to each other; and,
for a locking mode, the locking component is displaceable within the radially continuous space of the wedge plate to engage the wedge plate to:
radially expand the wedge plate; and,
non-rotatably connect the inner race, the wedge plate, and the outer race.

2. The wedge plate recited in claim 1, wherein for the locking mode, the locking component is displaceable within the radially continuous space of the wedge plate to engage the wedge plate to:
  circumferentially expand the wedge plate.

3. The wedge plate recited in claim 2, wherein for the locking mode, the locking component is axially displaceable.

4. The wedge plate recited in claim 1, wherein:
  the locking assembly includes a locking ring;
  the locking component extends from the locking ring; and,
  the locking component is a triangular prism including:
    a radially disposed leading edge; and,
    two oppositely arranged axially tapering sides connected to the radially disposed leading edge and the locking ring, wherein the radially disposed leading edge is parallel to the wedge plate.

5. The wedge plate recited in claim 1, wherein:
  the wedge plate includes first and second surfaces bordering the radially continuous space in a circumferential direction; and,
  the locking component includes third and fourth surfaces arranged to engage the first and second surfaces, respectively, to radially expand the wedge plate.

6. The wedge plate recited in claim 1, wherein:
  the locking assembly includes a locking ring;
  the locking component secured to the locking ring; and,
  the locking ring is axially displaceable.

7. The wedge plate recited in claim 1, wherein the wedge plate includes a first and second parallel end surfaces bordering the radially continuous space in a circumferential direction.

8. The wedge plate recited in claim 1, wherein:
  the wedge plate includes only one single radially continuous space; and,
  the locking assembly includes only one single locking component.

9. The wedge plate recited in claim 1, wherein the locking assembly includes an actuator arranged to displace the locking component.

10. A clutch, comprising:
  an inner race including a channel and a plurality of radially outwardly extending ramps;
  an outer race;
  a locking assembly including a locking component at least partially disposed in the channel;
  a wedge plate radially arranged between the inner and outer races and including:
    a plurality of radially inwardly extending ramps operatively arranged to engage the plurality of radially outwardly extending ramps;
  an outer circumferential surface;
  an inner circumferential surface; and,
  a radially disposed space connecting the inner and outer circumferential surfaces, wherein:
    for a free-wheel mode, the inner and outer races are independently rotatable;
    for a locking mode:
      the locking component is radially displaceable through the channel and the radially disposed space; and,
      the locking component is arranged to engage the wedge plate to radially expand the wedge plate and to non-rotatably connect the inner race, the wedge plate, and the outer race.

11. The wedge plate recited in claim 10, wherein the locking component is arranged to engage the wedge plate to circumferentially expand the wedge plate.

12. The wedge plate recited in claim 10, wherein the locking component is a triangular prism including:
  a radially disposed face; and,
  at least two oppositely arranged circumferentially disposed tapering sides connected to the radially disposed face, wherein the radially disposed face is orthogonal to an axis of rotation and the at least two oppositely arranged circumferentially disposed tapering sides engage the wedge plate.

13. The wedge plate recited in claim 10, wherein the locking assembly includes an actuator arranged to displace the locking component.

14. The wedge plate recited in claim 10, wherein:
  the wedge plate includes first and second surfaces bordering the radially disposed space in a circumferential direction; and,
  the locking component includes third and fourth surfaces arranged to engage the first and second surfaces, respectively, to radially expand the wedge plate.

15. The wedge plate recited in claim 10, wherein the wedge plate includes a first and second parallel end surfaces bordering the radially disposed space in a circumferential direction.

16. The wedge plate recited in claim 10, wherein:
  the wedge plate includes only one single radially disposed space; and,
  the locking assembly includes only one single locking component.

17. A clutch, comprising:
  an inner race including a plurality of radially outwardly extending ramps; an outer race;
  a locking assembly secured to the inner race and including a locking ring and a locking component; and,
  a wedge plate radially arranged between the inner and outer races and including:
    a plurality of radially inwardly extending ramps operatively arranged to engage the plurality of radially outwardly extending ramps;
  an outer circumferential surface;
  an inner circumferential surface; and,
    a radially disposed space connecting the inner and outer circumferential surfaces wherein the radially disposed space includes a first end surface and a second end surface which are parallel and bordering the radially disposed space in a circumferential direction; and, wherein:
  for a free-wheel mode, the inner and outer races are independently rotatable; and,
  for a locking mode:
    the locking ring is axially displaceable to displace the locking component axially through the radially disposed space; and,
    the locking component is arranged to engage the wedge plate to circumferentially and radially expand the wedge plate to non-rotatably connect the inner race, the wedge plate, and the outer race.

* * * * *